United States Patent [19]

Kawasaki

[11] Patent Number: 4,746,969
[45] Date of Patent: May 24, 1988

[54] VIDEO SIGNAL PROCESSING DEVICE FOR LINE SEQUENTIAL SIGNALS

[75] Inventor: Somei Kawasaki, Tokyo, Japan

[73] Assignee: Canon Kabushiki Kaisha

[21] Appl. No.: 866,330

[22] Filed: May 22, 1986

[30] Foreign Application Priority Data

May 24, 1985 [JP] Japan .................................. 60-111469

[51] Int. Cl.⁴ ......................... H04N 9/70; H04N 9/81
[52] U.S. Cl. ...................................... 358/26; 358/334; 358/11
[58] Field of Search .................. 358/26, 334, 11, 324, 358/160, 17–19

[56] References Cited

U.S. PATENT DOCUMENTS 3,975,759  8/1976  Taniguchi .............................. 358/26
4,209,800  6/1980  Yamamitsu ........................... 358/26

Primary Examiner—Michael A. Masinick
Attorney, Agent, or Firm—Toren, McGeady & Associates

[57] ABSTRACT

A video signal processing device rearranges line sequential signals included in a video signal into line simultaneous signals by detecting the kinds of information carried by them, respectively, for horizontal scanning periods; and adequately inhibits the line simultaneous signals from being produced.

20 Claims, 3 Drawing Sheets

VIDEO SIGNAL PROCESSING DEVICE FOR LINE SEQUENTIAL SIGNALS

BACKGROUND OF THE INVENTION

1. Field of the Invention

This invention relates to a video signal processing device and more particularly to a device for processing a video signal including line sequential color difference signals which are provided with characteristic parts for identification of the kinds of information carried by these signals.

2. Description of the Related Art

In detecting the presence or absence of color information within a video signal for the purpose of controlling a so-called color killer circuit, it has been practiced in general, to attain that purpose by detecting the carrier wave components of color information signals and by detecting the levels of them. In the case of a video tape recorder or a television receiver or the like, for example, the levels of the subcarriers in the burst signal parts of chrominance signals have been arranged to be detected. Further, in cases where color information is transmitted by means of line sequential color difference signals which are modulated by an FM modulation process or the like before transmission, the levels of the FM carrier signals have been arranged to be detected for this purpose.

The conventional method for detecting the presence or absence of color information necessitates detection of extremely slight variations in the FM carrier signal in detecting the FM carrier signal. Besides, the level variations are not only caused by the validity of the color information but also greatly attributable to other factors, for example: In the case of an apparatus for reproducing a video signal recorded on a recording medium, the level of the FM carrier signal greatly varies due due to trailing, head touch, etc., even when the color information is accurate. Therefore, in setting a threshold value for the detection circuit, the value must be very delicately adjusted. It is thus hardly possible to accurately detect the presence or absence of color information. As a result, the apparatus of this kind has often produced meaningless color information to degrade a reproduced picture or failed to produce necessary color information. Further, the color information is sometimes produced for an extremely short period of time. In accordance with the conventional method, it has been thus hardly possible to obtain satisfactorily reproduced pictures even when the color information is valid.

SUMMARY OF THE INVENTION

This invention is directed to the solution of the above-stated problems of the prior art. It is therefore a general object of this invention to provide a video signal processing device which is capable of accurately detecting the presence or absence of color information carried by the video signal and always adequately produces the video signal.

It is a more specific object of this invention to provide a video signal processing device which is capable of detecting the kind, the presence or absence of information carried by line sequential signals without necessitating delicate adjustment of a circuit constant.

Under this object, a video signal processing device arranged as an embodiment of this invention for processing video signals including line sequential signals comprises: detecting means for detecting the kinds of information carried by the line sequential signals respectively for every horizontal scanning period; arranging means for rearranging the line sequential signals into line simultaneous signals on the basis of the output signal of the detecting means; and inhibiting means for inhibiting the line simultaneous signals from being produced from the device on the basis of the output signal of the detecting means.

It is another specific object of this invention to provide a video signal reproducing apparatus which is capable of producing adequate video signals by satisfactorily processing reproduced line sequential signals even in cases where the S/N ratio of signals reproduced from a recording medium is extremely poor.

Under that object, a video signal reproducing apparatus, arranged as another embodiment of this invention for reproducing video signals including line sequential color signals, comprises: reproducing means for reproducing the video signals from a recording medium; separating means for separating the line sequential color signals and luminance signals from the video signals reproduced by the reproducing means; detecting means for detecting the kinds of color information carried by the line sequential color signals for every horizontal scanning period; arranging means for rearranging the line sequential color signals into line simultaneous color signals on the basis of the output signal of the detecting means; color killer means which acts on the line simultaneous color signals on the basis of the output signal of the detecting means; and mixing means for mixing the luminance signals and the line simultaneous color signals.

The above and further objects and novel features of the invention will become apparent from the following detailed description of preferred embodiments thereof taken in conjunction with the accompanying drawings.

DETAILED DESCRIPTION OF THE PREFERRED EMBODIMENTS

Figure 1:
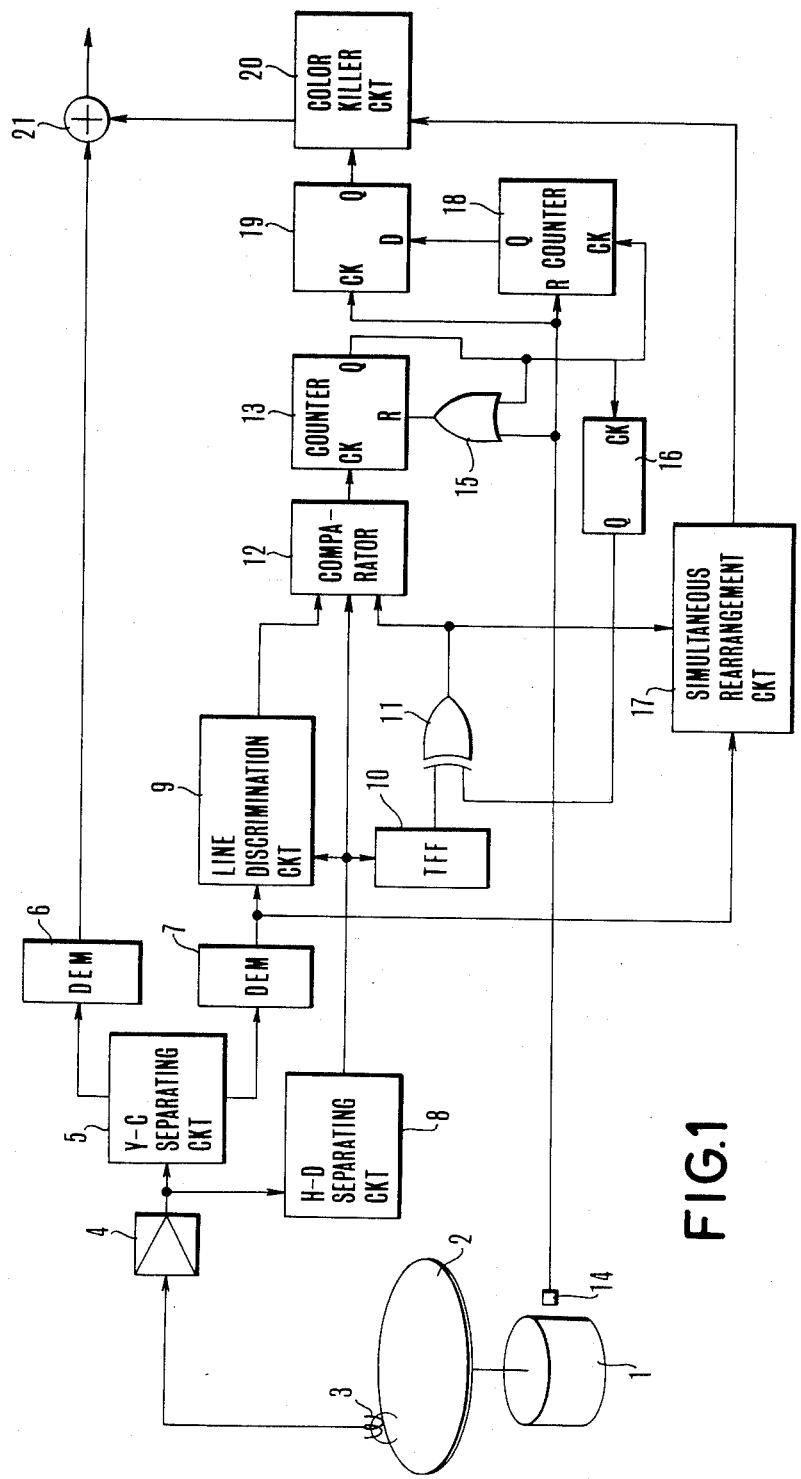
FIG. 1 is a diagram showing the arrangement of a still picture signal reproducing apparatus arranged as an embodiment of this invention.

In the case of the embodiment described in the following, this invention is applied to a still picture reproducing apparatus which is arranged to produce a still picture by repetitively reproducing one field portion of a video signal recorded in a circular recording track. FIG. 1 shows the arrangement of the reproducing apparatus arranged according to this invention as an embodiment thereof. A recording sheet 2 is arranged to be rotated by a motor 1 to make one turn for one field period. A head 3 is arranged to trace the recording track formed on the recording sheet 2. One and the same field portion of a video signal is thus continuously and repetitively reproduced by the head 3. The reproduced video signal is supplied to a reproduction amplifier 4. The output of the amplifier 4 is supplied to a Y-C separating circuit 5 to have a luminance signal and a line sequential color difference signal separated from each other. The two separated signals are supplied respectively to FM demodulation (hereinafter referred to as DEM) circuits 6 and 7. Meanwhile, a horizontal synchronizing signal (hereinafter referred to as HD signal), which is included in the reproduced video signal, is separated by an HD separating circuit 8. A line discrimination circuit 9 is arranged to detect the kind of the demodulated line sequential color difference signal for every horizontal scanning period (hereinafter referred to as H period). For example, in case that the line sequential color difference signal consists of B-Y and R-Y signals each of which is arranged to have a DC offset part at least during a specific period of time, the line discrimination circuit 9 detects this as a characteristic part. The circuit 9 produces a signal for every H period at a high level, for example, when the B-Y signal has the DC offset and at a low level when the R-Y signal has the DC offset. Under a normal condition, the line discrimination circuit 9 signal is of a rectangular waveform having a 2H period.

The HD signal is supplied also to a T type flip-flop (hereinafter referred to as TFF) 10. The TFF 10 also produces a rectangular wave signal of a 2H period. The output of the line discrimination circuit 9 and that of the TFF 10 are compared with each other at a comparator 12. If they are found to differ from each other in polarity, the comparator 12 produces a pulse output for every H period.

The pulse output of the comparator 12 is counted by a counter 13. The counter 13 is reset every time the sheet 2 makes one turn by means of a rotation detection signal (hereinafter referred to as PG signal) which represents the rotation of the motor 1. The counter 13 is arranged to have its counted value brought back to zero via an OR gate 15 when it produces a Q output after counting, for example, $2^4$ pulses or thereabout. The output of this counter 13 is supplied to a flip-flop (FF) 16 to invert thereby the output of an exclusive OR circuit (hereinafter referred to as EXOR) 11. With the embodiment arranged in this manner, if the polarity of the output of the line discrimination circuit 9 and that of the output of the EXOR 11 differ from each other for at least a $2^4$-H period, the output of the EXOR 11 is judged to have its phase inverted relative to the phase of the output of the circuit 9. Then, the embodiment causes their phases to coincide with each other, The output of the EXOR 11 is supplied to a simultaneous rearrangement circuit 17. The circuit 17 then performs a simultaneous rearranging process on the output of the DEM 7 to make it into a chrominance signal.

In case that the counter 13 produces the Q output for a second time within one and the same field period, however, the output signal of the line discrimination circuit 9 produced within one field period would become irregular even if the phase of the output of the EXOR 11 is inverted. Therefore, this is detected and can be used in determining the validity or invalidity of the color signal.

A counter 18 is arranged, for example, to produce the Q output thereof when the Q output of the other counter 13 is obtained at least twice within one field period. The output of the counter 18 is supplied to a D flip-flop (hereinafter referred to as DFF) 19. A color killer circuit 20 is thus controlled by the output of the DFF 19 for every field. The luminance signal produced from DEM circuit 6 and the chrominance signal, which is obtained via the color killer circuit 20, are added up at an adder 21. In accordance with the above-stated arrangement of this embodiment, the FM carrier of the line sequential color difference signals does not have to be detected. The arrangement of the embodiment, therefore, obviates the necessity for adjustment of the constants of circuit elements and yet the validity of the color signals can be effectively detected.

Figure 2:
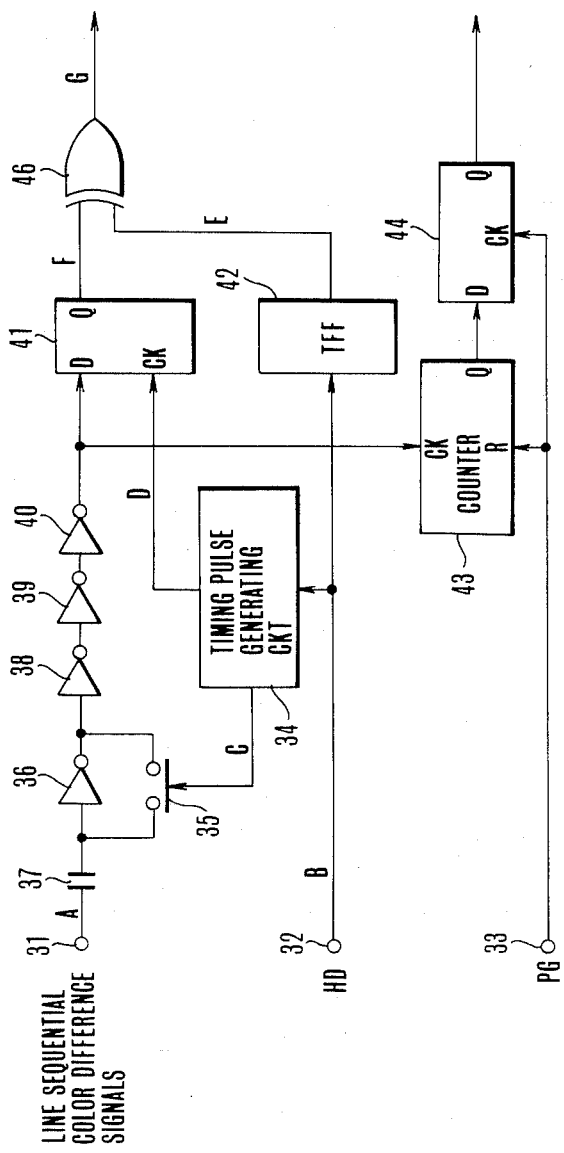
FIG. 2 is a diagram showing the arrangement of the essential parts of another embodiment of the invention.
Figure 3:
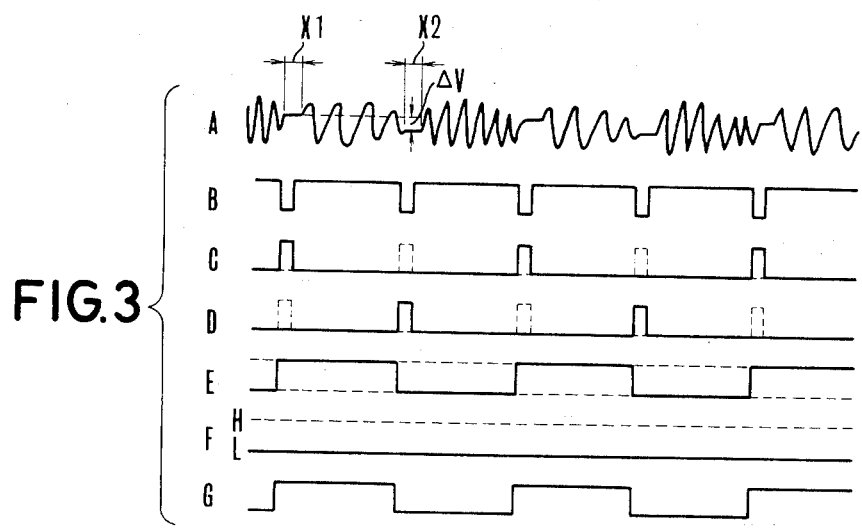
FIG. 3 is a timing chart showing the output waveforms of various parts of FIG. 2.

FIG. 2 shows the arrangement of the essential parts of another embodiment of this invention. The illustration includes input terminals 31, 32 and 33 which receive demodulated line sequential color difference signals having DC offsets interposed in between lines, HD signal and the PG signal respectively. FIG. 3 is a timing chart showing the waveforms of the outputs of various parts of FIG. 2. The embodiment operates as follows:

Referring to FIG. 3, when the signal of a wave form as shown at a part A in FIG. 3 is received at the terminal 31, a timing pulse generating circuit 34 produces pulse signals of 2H period as shown at parts C and D of FIG. 3 on the basis the HD signal which is received at the terminal 32 and is of a waveform as shown at a part B of FIG. 3. The pulse signal C turns on an analog switch 35 to short-circuit the input and output terminals of an inverter 36 at every 2H period. Following this, the level of the line sequential color difference signal, obtained during an offset discrimination period X1 indicated in FIG. 3, is retained at a coupling capacitor 37 as a reference voltage. An offset level, which is obtained during a discrimination period X2 (FIG. 3) for a next line, is either higher or lower by a value $\Delta V$ than the offset level obtained during the offset discrimination period X1.

After the reference voltage is set, a level of difference between the color diffrerence signal and the reference voltage is amplified up to a logical level through inverters 38, 39 and 40 and is then supplied to the D input terminal of a DFF 41. In this instance, since the pulse signal D is generated in synchronism with the discrimination period X2, the DFF 41 produces from its Q output terminal a signal which is obtained by amplifying the level of difference between the levels obtained during the discrimination periods X1 and X2 up to a high or low logical level.

Meanwhile, the HD signal is supplied to a TFF 42. The TFF 42 then produces a rectangular wave signal of a 2H period as shown at a part E of FIG. 3. If the line sequential color difference signals received are in accordance with a predetermined order, the Q output of the DFF 41 is always either at a high level or at a low level. An EXOR 46 is arranged to allow the rectangular wave pulse signal E of 2H period to pass therethrough either as it is or by inverting it forming the signal G. The output of the EXOR 46 is supplied as a line discrimination signal to the line simultaneous rearrangement circuit 17 of FIG. 1.

In case that the line sequential color difference signals are carrying valid information, the DFF 41 has the D input thereof always at a constant high or low level. If the D input often changes between the high and low levels, the information carried by the line sequential color difference signals can be judged to be invalid. The D input of the DFF 41 is counted by a counter 43, which is arranged to be reset by the PG signal. When the counter 43 counts at least a predetermined number within one field period, it produces the Q output thereof at a high level. This Q output is supplied via a DFF 44 to the color killer circuit 20 in the same manner as in the case of the preceding example of embodiment which is shown in FIG. 1.

The arrangement of the embodiment shown in FIG. 2 permits use of CMOS elements for nearly all the circuits. Therefore, in addition to the same advantageous effect as the embodiment shown in FIG. 1, the embodiment shown in FIG. 2 is suited for use of an IC so that circuit arrangement can be further simplified.

What is claimed is:

1. A video signal processing device for processing video signals which include line sequential signals including plural kinds of signals, comprising:
   (a) detecting means for detecting the kinds of said line sequential signals, respectively, for every line scanning period;
   (b) arranging means for rearranging said line sequential signals into line simultaneous signals on the basis of an output signal of said detecting means; and
   (c) inhibiting means for inhibiting said line simultaneous signals from being produced from said device on the basis of the output signal of said detecting means.

2. A device according to claim 1, wherein said video signals include luminance signals and line sequential color signals.

3. A device according to claim 2, further comprising:
   separating means for separating said luminance signals and said line sequential color signals from said video signals; and
   mixing means for mixing said line simultaneous color signals, which are produced from said arranging means, with said luminance signals.

4. A device according to claim 3, wherein said inhibiting means is arranged to inhibit said line simultaneous color signals from being supplied to said mixing means.

5. A device according to claim 1, further comprising:
   means for generating a periodic signal having a period equivalent to two scanning periods of said video signal; and
   phase control means for controlling a phase of said periodic signal on the basis of the output signal of said detecting means, wherein said arranging means rearranges said line sequential signals into said line simultaneous signals by using said periodic signal whose phase is controlled by said phase control means.

6. A device according to claim 5, wherein both the output signal of said detecting means and said periodic signal are rectangular wave signals; and said phase control means includes comparison means for comparing the state of the output signal of said detecting means and that of said phase controlled periodic signal for every scanning period of said video signal.

7. A device according to claim 6, wherein said inhibiting means operates on the basis of an output signal of said comparison means.

8. A device according to claim 6, wherein said phase control means further includes discriminating means for detecting that the number of scanning periods, during which the output signal of said detecting means and the phase controlled periodic signal are obtained in different states from each other within a predetermined period of time, has reached a predetermined number, and said phase control means shifts the phase of said periodic signal on the basis of an output of said discriminating means.

9. A device according to claim 8, wherein said inhibiting means is arranged to operate on the basis of the output of said discriminating means.

10. A device according to claim 9, wherein said inhibiting means includes counting means for counting the number of discrimination performances made for detection of said predetermined number by said discriminating means within said predetermined period of time.

11. A device according to claim 5, wherein said line sequential signals are DC offset at least during a specific period of time for every scanning period; and said detecting means includes a detecting circuit arranged to detect, at every two scanning periods, the direction in which said line sequential signals are DC offset during said specific periods within each of two adjacent scanning periods.

12. A device according to claim 11, wherein said detecting circuit includes a circuit which holds the level of said line sequential signals obtained during said specific period of time at every two scanning periods, and capacity means which is arranged to receive said held level at one of two terminals thereof and said line sequential signals at the other terminal thereof.

13. A device according to claim 11, wherein said inhibiting means is arranged to operate on the basis of an output of said detecting circuit.

14. A device according to claim 13, wherein said inhibiting means includes counting means for counting the number of changing times of the direction of the DC offset detected by said detecting circuit during a predetermined period of time.

15. A video signal reproducing apparatus for reproducing video signals including luminance signals and line sequential color signals having plural kinds of signals, comprising:
   (a) reproducing means for reproducing said video signals from a recording medium;
   (b) separating means for separating said line sequential color signals and luminance signals from said video signals reproduced by said reproducing means;
   (c) detecting means for detecting the kinds of said line sequential color signals for every line scanning period;
   (d) arranging means for rearranging said line sequential color signals into line simultaneous color signals on the basis of an output signal of said detecting means;
   (e) color killer means which acts on said line simultaneous color signals on the basis of the output signal of said detecting means; and
   (f) mixing means for mixing said luminance signals and said line simultaneous color signals.

16. An apparatus according to claim 15, wherein said color killer means is arranged to operate for every vertical scanning period.

17. An apparatus according to claim 16, further comprising first control signal generating means for generating a first control signal for controlling said arranging means on the basis of the output signal of said detecting means.

18. An apparatus according to claim 17, further comprising:
   counting means for counting a number of changing times of a state of said first control signal during each vertical scanning period; and
   second control signal generating means for generating a second control signal for controlling said color killer means on the basis of a counted output of said counting means.

19. An apparatus according to claim 15, wherein the luminance signals and the line sequential color signals recorded on said recording medium are respectively FM modulated.

20. An apparatus according to claim 19, further comprising:
means for FM demodulating the FM modulated luminance signals separated by said separating means; and
means for FM demodulating the FM modulated line sequential color signals separated by said separating means.

* * * * *